United States Patent [19]
Easter et al.

[11] Patent Number: 6,047,375
[45] Date of Patent: Apr. 4, 2000

[54] CRYPTOGRAPHIC PROCESSOR WITH INTERCHANGEABLE UNITS

[75] Inventors: Randall Jay Easter, Poughquag; James Walter Bode, Wappingers Falls, both of N.Y.

[73] Assignee: International Business Machines Corporation, Armonk, N.Y.

[21] Appl. No.: 09/034,827

[22] Filed: Mar. 4, 1998

[51] Int. Cl.[7] .................................................. G06F 3/00
[52] U.S. Cl. ...................... 713/189; 395/500.02; 713/200
[58] Field of Search ..................................... 713/200, 189; 364/130, 134; 395/500.01–500.1

[56] References Cited

U.S. PATENT DOCUMENTS

| | | | |
|---|---|---|---|
| 5,410,726 | 4/1995 | Baqai et al. | 395/800 |
| 5,423,044 | 6/1995 | Sutton et al. | 395/725 |
| 5,530,753 | 6/1996 | Easter et al. | 380/4 |
| 5,675,724 | 10/1997 | Beal et al. | 395/182.02 |

FOREIGN PATENT DOCUMENTS

0575067A2  12/1993  European Pat. Off. ........ G06F 15/16

*Primary Examiner*—Tod R. Swann
*Assistant Examiner*—Trevor Quick Coddington
*Attorney, Agent, or Firm*—Lynn L. Augspurger

[57] ABSTRACT

A computer system having multiple processors wired to a common MCM substrate in which insertable processor chips themselves carry fencing appropriate to their function on the multi-chip module in which they are inserted for optimizing needed functions with fencing of interfaces to permit cryptographic functions to be added by inserting a cryptographic by providing each processor of the multichip module with its own cryptographic coprocessor as needed enabling alternative configurations of the computer system using a common substrate but differing processing units and cryptographic coprocessors.

4 Claims, 1 Drawing Sheet

CRYPTOGRAPHIC PROCESSOR WITH INTERCHANGEABLE UNITS

FIELD OF THE INVENTION

This invention is related to computer systems, and particularly to a computer system which has a cryptographic processor function in which processing units and cryptographic elements have a common footprint and are interchangable units on a commmon multichip module substrate.

BACKGROUND OF THE INVENTION

International Business Machines Corporation has manufactured very advanced mainframe systems and servers such as the current ES/9000 and CMOS S/390 ESA/390 (all trademarks of International Business Machines Corporation) servers and provided them with Cryptographic coprocessors to execute the cryptographic needs of sophisticated users while processing transactions with the machines that are serviced by such systems. These are needed for sophisticated financial transactions and other transactions as may occur on the web where the authenticity of the user and or transaction is appropriately encrypted so that it is not available to interlopers. These advanced machines implement two cryptographic coprocessors. However the need for use of cryptography in numerous transactions is so large that users have started to experience application performance degradation for cryptographic applications. We have determined that this is due to having only two processor units being able to execute tasks which have cryptographic content since only these two processor units have attached cryptographic coprocessors in these most modern configurations. A bottle neck develops where tasks are all assigned by the dynamic optimizing system configuration to just those two (2) processors and other processors in the central electronics complex (CEC as the scalable machine processors are known) are under utilized since they do not all have attached cryptographic coprocessors. One can question how this problem can be solved, and it is to this problem that our claimed solution is directed.

SUMMARY OF THE INVENTION

Our invention provides for optimization of system performance by providing for interchangeability of cryptographic coprocessors and central processors of a CEC.

Thus the CEC or computer system will have a plurality of processors having a common footprint bonded to a common substrate with interconnection wiring on said common substrate coupling the processors of a determined configuration. This configuration can have differing cryptographic capability because of fencing wires for fencing interfaces to and from the processors inserted into and bonded to the common substrate to assign particular processors to a particular logical function.

Each of said processors having a common footprint on said common substrate so as to allow any of said processors to be located physically at any location for a processor on said common substrate;

These and other improvements are set forth in the following detailed description. For a better understanding of the invention with advantages and features, refer to the description and to the drawings.

DETAILED DESCRIPTION OF THE INVENTION

Before considering our preferred embodiments in detail, it may be worthwhile to illustrate, alternative and unacceptable answers to the problem we have answered by our preferred embodiment. Adding additional cryptographic coprocessors would be the natural answer to the question, but developing and adding additional cryptographic coprocessors for all necessary configurations is cost prohibitive. Chip sites are utilized for processor chips and adding extra sites for cryptographic coprocessor chips adds unacceptable multichip module MCM costs.

So we needed to solve the performance congestion and did so by by adding additional cryptographic coprocessors such that each processor unit (e.g. PU-0) has its own cryptographic coprocessor (e.g. CE-0) but this is done without adding additional chip sites on the MCM package.
Solution For those customers who have high cryptographic task content and require additional throughput that adding addition processor units can not solve we provide for adding add additional cryptographic coprocessor's such that each processor unit has access to its own cryptographic coprocessor on a standard multi-chip module on its multichip module common substrate 15. We do this by reducing the total number of processor units on such multichip module common substrate 15 such that the sites or footprints of a processor unit e.g. PU-1 and any accociated cache level e.g. L2-1 occupied by them can be populated with cryptographic coprocessors by changing the configuration shown, say, in FIG. 1 to the configuration shown in FIG. 2 having the processor PU-1 replaced by CE-2 and the cache footprint 15 unused and fenced 13 from the other elements on the multichip module common substrate, which is a form the customer can order if preferred.

Using this approach the following could be achieved:
  10 processor units+2 cryptographic coprocessors Current S/390 CMOS Configuration
  8 processor units+4 cryptographic coprocessors Optional S/390 CMOS Configuration
  6 processor units+6 cryptographic coprocessors Optional S/390 CMOS Configuration.

Figure 1:
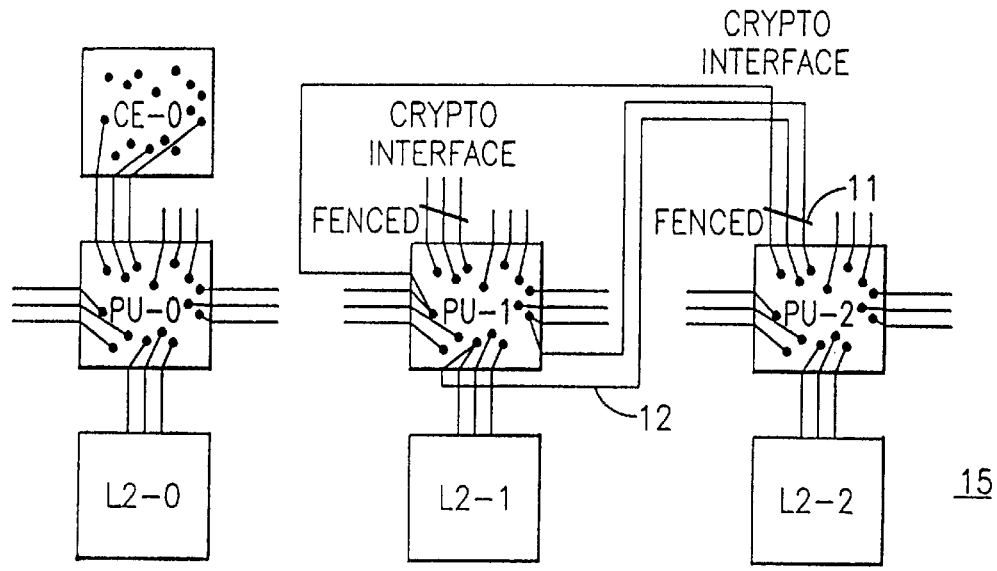
FIG. 1 shows schematically an overview of the preferred embodiment shows the interchangeability of processor unit chips and cryptographic coprocessor chips as part of the same system module of a SMP CEC with its hierarchical cache memory, and and particularly shows in FIG. 1 a first configuration
Figure 2:
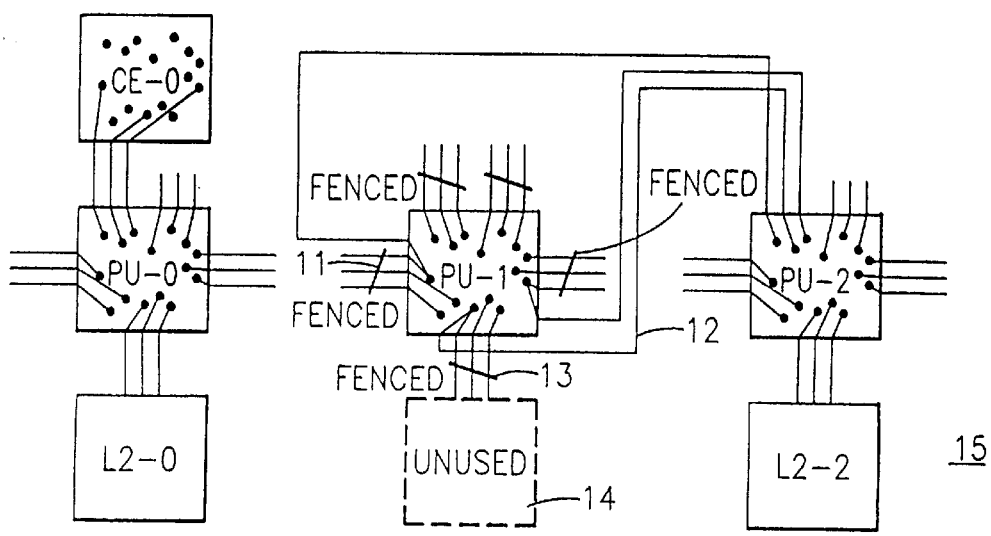
FIG. 2 shows a second configuration which could be ordered after implementing our invention of the interchange processor unit chips and cryptographic coprocessor chips as part of a same system module of a SMP (Symmetrical Multiprocessor) CEC with its hierarchical cache memory for an exchanged configuration.

In accordance with our invention the cryptographic coprocessor and the processor chips are designed such that they have a common footprint from a base technology relationship—however not from a logical utilization. As shown in FIG. 1 and FIG. 2 the MCM wiring provides multi-drop nets (e.g. 12) for those that are shared between any cryptographic coprocessor used nets and those used by the processors themselves. As shown in FIG. 1 and FIG. 2 fencing (e.g. 11) is provided on the respective processor and coprocessor chip mounts or the chips themselves for those chips which occupy the MCM chip site.

The optional configuration that a customer could order as illustrated by FIG. 2 allows a site's footprint normally used by a processor e.g. PU-1 in FIG. 1 and its associated cache e.g. L2-1 in FIG. 1 to be replaced by a cryptographic coprocessor e.g. CE-2 in FIG. 2 and the footprint 14 normally used for a cache position to be unused and fenced (e.g.13) from the cryptographic coprocessor.

As a result a single MCM Substrate (and all the savings which result from a single part and part number) is provided with our invention in which the insertable chips themselves carry fencing appropriate to their function on the multi-chip module in which they are inserted for optimizing needed cryptographic functions by providing each processor of the multichip module common substrate 15 with its own cryptographic coprocessor as needed. Our solution avoids still another alternative solution which would have added costs by providing a larger MCM to hold additional cryptographic coprocessors. As whether or not customers need the additional performance provided by additional coprocessors this reduces the costs for all, especially those who would otherwise needlessly bear the cost of the larger MCM's. For those that do need our upgrade with the additional cryptographic coprocessors the new systems are built and delivered using common parts.

While we have described our preferred embodiments of our invention, it will be understood that those skilled in the art, both now and in the future, may make various improvements and enhancemenets which fall within the scope of the claims which follow. These claims should be construed to maintain the proper protection for the invention first disclosed.

What is claimed is:

1. A computer system, comprising;
    a plurality of processors having a common footprint bonded to a common substrate with interconnection wiring on said common substrate coupling said processors;
    said wiring including fencing wires for fencing interfaces to arid from said processors to assign particular processors to a particular function on said common substrate;
    each of said processors having a common footprint on said common substrate so as to allow any of said processors to be located physically at any location for a processor on said common substrate;
    said particular functions including functioning as a processing unit or as a cryptographic element, said fencing wires preventing use of a cryptographic interface from a cryptographic element to a processing unit when the location to which said cryptographic interface can be coupled is used by a processing unit but enabling use of said cryptographic interface from a cryptographic element when said location is used by a cryptographic element.

2. A computer system according to claim 1 wherein said common footprint provides for a physical change in location of any processor on said common substrate but does not define the logical utilization of a processor at any particular location on said common substrate.

3. A computer system according to claim 2 wherein said substrate is a common substrate of a multichip module and said wiring includes multi-drop nets for those wires that are shared between any cryptographic coprocessor used nets and those used by the processors themselves.

4. A computer system according to claim 3 wherein configuration of the function of said processors on the common substrate provided for alternative additional cryptographic coprocessors in a configuration such that each processor unit has its own cryptographic coprocessor, but this is done without adding additional chip sites on the multichip module.

* * * * *

UNITED STATES PATENT AND TRADEMARK OFFICE
CERTIFICATE OF CORRECTION

PATENT NO. : 6,047,375
DATED : April 4, 2000
INVENTOR(S) : Easter et al.

It is certified that error appears in the above-identified patent and that said Letters Patent are hereby corrected as shown below:

Column 4, line 2 "arid" should be --and--.

Signed and Sealed this

Twenty-fourth Day of April, 2001

Attest:

NICHOLAS P. GODICI

Attesting Officer *Acting Director of the United States Patent and Trademark Office*